United States Patent
Fang et al.

(10) Patent No.: US 9,625,635 B2
(45) Date of Patent: Apr. 18, 2017

(54) LIGHT SOURCE AND BACKLIGHT MODULE

(71) Applicant: HON HAI PRECISION INDUSTRY CO., LTD., New Taipei (TW)

(72) Inventors: Chien-Chung Fang, New Taipei (TW); Chia-Chun Hsu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/833,690

(22) Filed: Aug. 24, 2015

(65) Prior Publication Data

US 2016/0341867 A1 Nov. 24, 2016

(30) Foreign Application Priority Data

May 21, 2015 (TW) .............................. 104116347 A

(51) Int. Cl.
*F21V 8/00* (2006.01)
(52) U.S. Cl.
CPC ........... *G02B 6/002* (2013.01); *G02B 6/0073* (2013.01)
(58) Field of Classification Search
CPC ............................ G02B 6/002; G02B 6/0073
See application file for complete search history.

(56) References Cited

U.S. PATENT DOCUMENTS

| 8,690,416 B2 * | 4/2014 | Jung ...................... G09F 13/18 362/231 |
| 2014/0176873 A1 * | 6/2014 | Shinohara ............ G02B 6/0016 349/65 |

FOREIGN PATENT DOCUMENTS

| CN | 2731497 Y | 10/2005 |
| TW | 200821697 A | 5/2008 |
| TW | M416777 U | 11/2011 |

* cited by examiner

*Primary Examiner* — Thomas M Sember
(74) *Attorney, Agent, or Firm* — Steven Reiss

(57) ABSTRACT

A light source includes a light emitter configured to emit light, and a light guiding member located at a side of the light emitter. The light guiding member includes a first light entering face, a first light exiting face and a top face connecting the first light entering face and the first light exiting face. The first light entering face is coupled to the light emitter. The first light entering face is opposite to the first light exiting face. The first light entering face has a height larger than that of the first light exiting face. The top face includes a first connecting face and a second connecting face extending from an angle relative to the first connecting face. The light guiding member is configured to receive the light from the light emitter via the first light entering face and output the light via the first light exiting face.

20 Claims, 4 Drawing Sheets

LIGHT SOURCE AND BACKLIGHT MODULE

FIELD

The subject matter herein generally relates to optical devices, particularly relates to a light source and a backlight module with the light source.

BACKGROUND

Light sources are applied in illumination devices or display devices. In the display device, the light source is used in a backlight module. The backlight module can include the light source and a light guiding board matching the light source.

BRIEF DESCRIPTION OF THE DRAWINGS

Implementations of the present technology will now be described, by way of example only, with reference to the attached figures.

DETAILED DESCRIPTION

Figure 1:
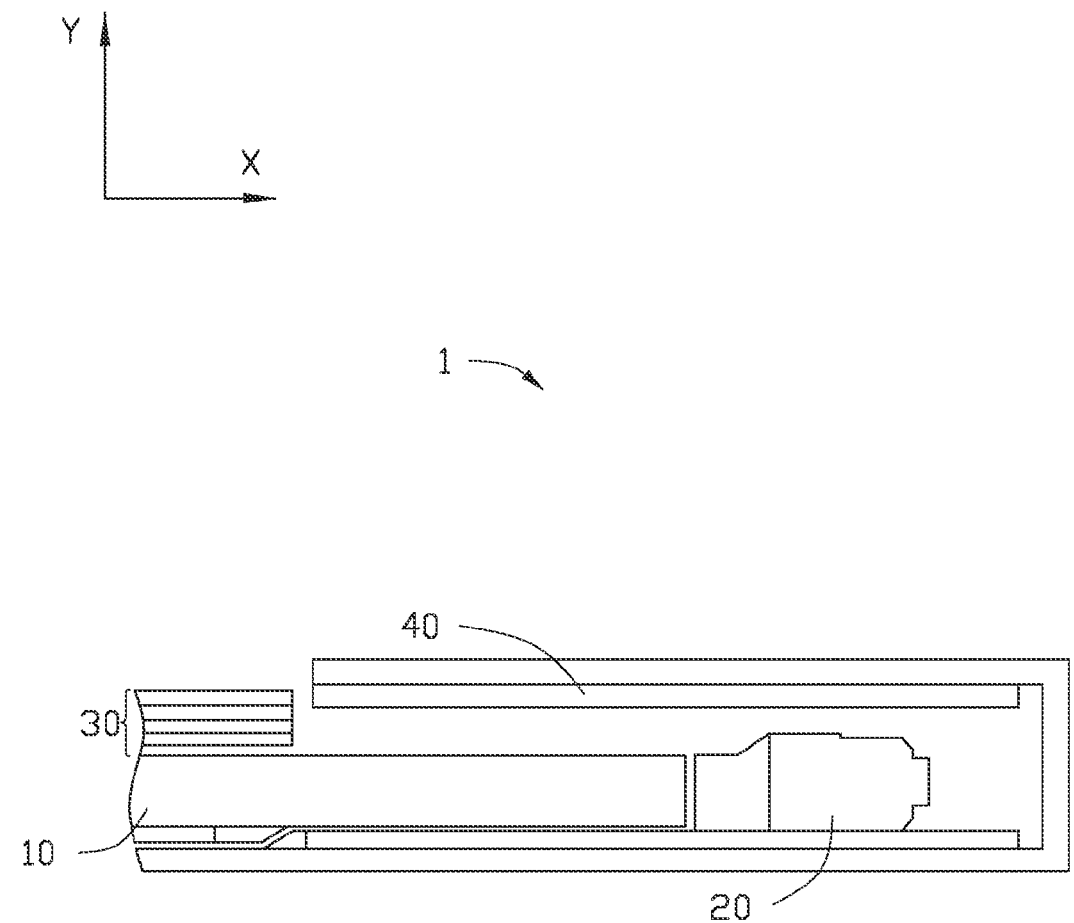
FIG. 1 is a side view of a backlight module in accordance with an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation to a light source. The light source can include a light emitter configured to emit light, and a light guiding member located at a side of the light emitter. The light guiding member can include a first light entering face, a first light exiting face and a top face connecting the first light entering face and the first light exiting face. The first light entering face is coupled to the light emitter. The first light entering face is opposite to the first light exiting face. The first light entering face has a height larger than that of the first light exiting face. The top face can include a first connecting face and a second connecting face extending from an angle relative to the first connecting face. The light guiding member is configured to receive the light from the light emitter via the first light entering face and output the light via the first light exiting face.

The present disclosure is described further in relation to a backlight module. The backlight module can include a light guiding board and a light source module located at a side of the light guiding board. The light source module can be configured to provide light to the light guiding board. The light source module can include at least a light source comprising a light emitter configured to emit light and a light guiding member configured to guiding the light from the light emitter to the light guiding board. The light guiding member can include a first light, entering face facing the light emitter, a first light exiting face, and a top face connecting the first light entering face and the first light exiting face. The first light exiting face is adjacent to the light guiding board. The first light exiting face has a height less than a height of the first light entering face. The top face can include a first connecting face and a second connecting face extending from and angled relative to the first connecting face. The light from the light emitter can enter the light guiding member via the first light entering face and exit the light guiding member via the first light exiting face to reach the light guiding board.

FIG. 1 illustrates a backlight module 1 of an embodiment of the present disclosure. The backlight module 1 can include a light guiding board 10, a light source module 20 and an optical diaphragm unit 30. The light source module 20 is configured to provide light to the light guiding board 10. The optical diaphragm unit 30 is configured to process the light passing through the light guiding board 10.

In FIG. 1, the backlight module 1 is illustrated relative to an X-Y coordinate system. The light guiding board 10 is located at a side of the light source module 20 in a negative X-direction relative to the light source module 20. The light guiding board 10 is on a light path of the light from the light source module 20. The light guiding board is configured to collect the light emitted from the light source module 20 and change the light to plane light.

The light source module 20 can emit the light along the negative direction to the X-direction. The light guiding board 10 can change the light from the light source module 20 to the plane light along a Y-direction.

The optical diaphragm 30 is located at a side of the light guiding board 10 along the Y-direction. The optical diaphragm 30 is configured to process lights from the light guiding board 10. The optical diaphragm 30 is on a light path of the plane light from the light guiding board 10 along the Y-direction. The optical diaphragm 30 can include a brightness enhancement film configured to enhance light brightness, and a prism film configured to adjust light direction.

The backlight module 1 can further include a frame 40 located a periphery of the light guiding board 10 and the light source module 20. The frame 40 supports and mounts the light guiding board 10, the light source module 20 and the optical diaphragm 30.

Figure 2:
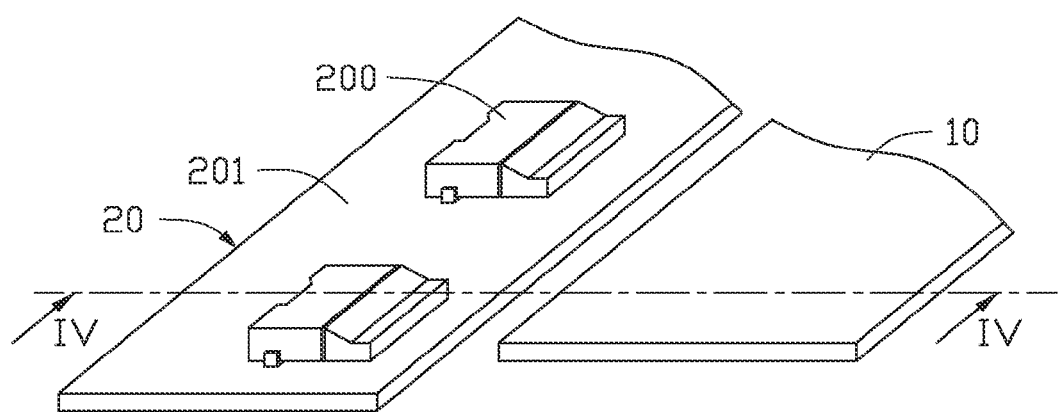
FIG. 2 is an isometric view of a light source module and a light guiding board of the backlight module of FIG. 1.

FIG. 2 illustrates that the light source module 20 can include a plurality of light sources 200 and a driving circuit board 201 configured to provide driving power to the light sources 200. The light sources 200 are evenly and spaced apart from each other mounted on the driving circuit board 201.

The driving circuit board 201 is a soft and opaque insulation board. The driving circuit board 201 can include a plurality of wires and a plurality of voltage conversion circuits. The light sources 200 are electrically coupled to the wires and voltage conversion circuits.

Figure 3:
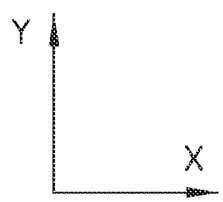
FIG. 3 is an exploded, isometric view of the light source of FIG. 2.
Figure 3:
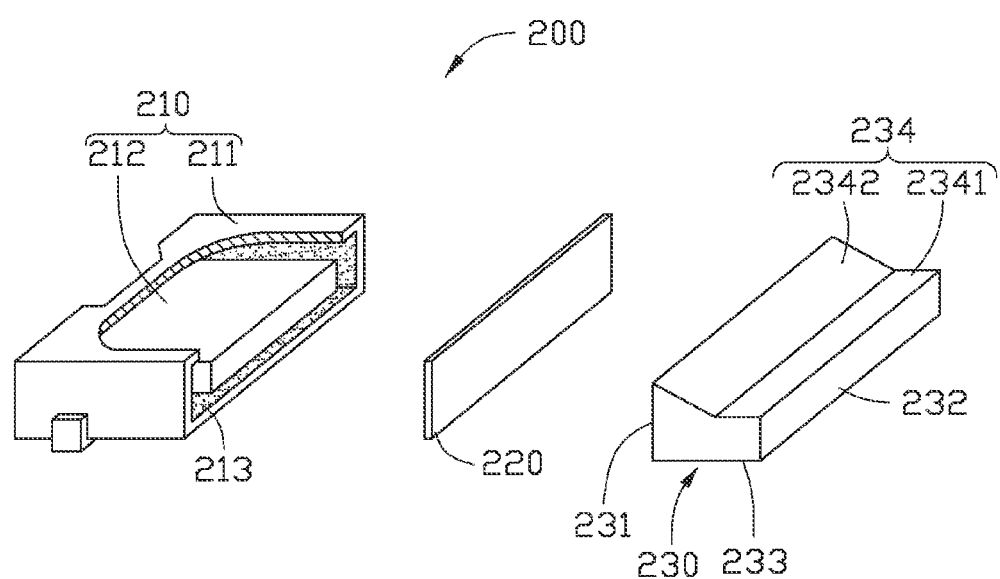

FIG. 3 illustrates that each light source 200 can include a light emitter 210 and a light guiding member 230. The light emitter 210 can include an enclosure 211 and a light emitting chip 212 in the enclosure 211. The enclosure 211 defines a receiving room with an opening facing the light guiding member 230. The light emitting chip 212 is received in the receiving room. The light emitting chip 212 includes a light emitting face facing the opening. The light emitting face of the light emitting chip 212 can have a height substantially equal to a height of the opening. The light emitting chip 212 can be electrically coupled to the driving circuit board 201 via electric conducting member. In at least one embodiment, the light emitting chip 212 can include a light emitting diode.

The light emitter 210 can further include a phosphor layer 213 at least facing the light emitting face of the light emitting chip 211. The phosphor layer 213 is configured to change color of the light emitted by the light emitting chip 211. Taking an example, when the light emitting chip 211 emits blue light, the phosphor layer 213 can be a yellow phosphor layer, which changes the blue light to be white light when the blue light passes through the yellow phosphor layer.

The light guiding member 230 can include a first light entering face 231, a first light exiting face 232, a first bottom face 233 and a first top face 234. In at least one embodiment, the first light entering face 231 is opposite to the first light exiting face 232. The first bottom face 233 and the first top face 234 each are connected between the first light entering face 231 and the first light exiting face 232. The first bottom face 233 is opposite to the first top face 234. In FIG. 3, the first bottom face 233 is shown in an X plane where the X axis is located. A plane perpendicular to the X plane is shown as a Y plane.

The first light entering face 231 is parallel to the Y plane. The first light entering face 231 is coupled to the light emitter 210. In at least one embodiment, the first light entering face 231 is coupled to the phosphor layer 213 via a bonding layer 220. The bonding layer 220 combines the light emitter 210 and the light guiding member 230 together. The phosphor layer 213 is located between the bonding layer 220 and the light emitting chip 212. The first light entering face 231 is configured to receive the light emitted by the light emitter 210. In at least one embodiment, the first light entering face 231 covers the opening of the enclosure 211, thereby the light emitting chip 212 being enclosed in the enclosure 211. The first light entering face 231 has a height no less than a height of the light emitting chip 212. In at least one embodiment, the first light entering face 231 has a size of an orthographic projection thereof in the Y plane larger than that of an orthographic projection of the light emitting chip 212 in the Y plane. In at least one embodiment, the first light entering face 231 has the size of the orthographic projection thereof in the Y plane substantially equal to that of an orthographic projection of the light emitter 210 in the Y plane. The bonding layer 220 can be made of material of optically clear resin.

The first light exiting face 232 is located adjacent to the light guiding board 10, and configured to output the light passing through the first entering face 231 to the light guiding board 10. The first light entering face 231 has the size of the orthographic projection thereof in the Y plane larger than that of an orthographic projection of the first light exiting face 232 in the Y plane. That is to say, the light guiding member 230 has a height at the first light entering face 231 larger than a height thereof at the first light exiting face 232. The first light exiting face 232 is parallel to the Y plane.

The first top face 234 can include a first connecting face 2341 and a second connecting face 2342 extending from the first connecting face 2341. The first connecting face 2341 is parallel to the first bottom face 233. The first connecting face 2341 is located between the first light exiting face 232 and the second connecting face 2342, and is perpendicularly coupled to the first light exiting face 232. The second connecting face 2342 is angled relative to the first connecting face 2341 and the first light entering face 231. The second connecting face 2342 is located between the first light entering face 231 and the first connecting face 2341, and is coupled to the first light entering face 231.

Each of the bottom face 233 and the top face 234 is coated with light reflective material, such as silver or aluminum, for reflecting light reaching the bottom face 233 and the top face 234, thereby ensuring the light entering the light guiding member 230 to be output via first light exiting face 232.

Figure 4:
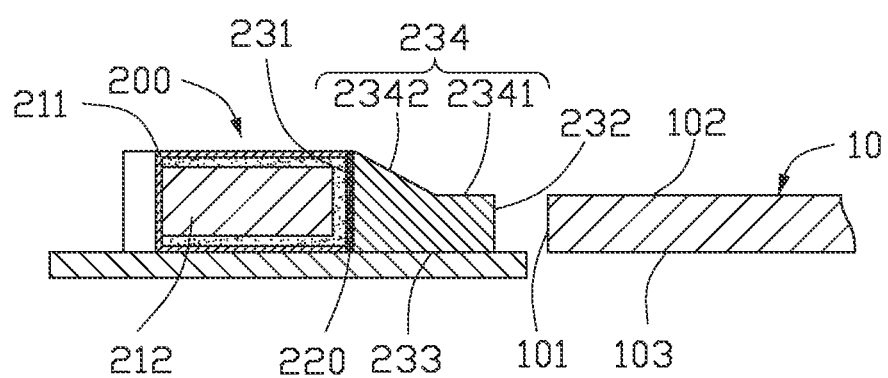
FIG. 4 is a cross sectional view of the light source module and the light guiding board of FIG. 2 taken along a line IV-IV.

FIG. 4 illustrates that the light guiding board 10 can include a second light entering face 101, a second light exiting face 102 and a second bottom face 103. The second light entering face 101 connects between the second light exiting face 102 and the second bottom face 103. The second bottom face 103 is parallel to the first bottom face 233. In at least one embodiment, the second bottom face 103 is coplanar with the first bottom face 233. The second light exiting face 102 is opposite and parallel to the second bottom face 103. In at least one embodiment, the light guiding board 10 has a constant thickness.

The second light entering face 101 is perpendicular to the second bottom face 103 and the second light exiting face 102. The first light exiting face 232 has the size of the orthographic projections thereof in the same Y plane as that of an orthographic projection of the second light entering face 102 in the Y plane. The first light exiting face 232 has a height same as that of the second light entering face 102 along the Y direction. The second light entering face 101 has a shape matching with that of the first light exiting face 232. For an example, when the second light entering face 101 is perpendicular to the second bottom face 103, the first light exiting face 232 is a planer. When the second light entering face 101 has a convex structure projecting toward the light source module 20, the first light exiting face 232 is a concave structure indenting toward the first light entering face 231, and facing the convex structure of the second light entering face 101.

In at least one embodiment, the light guiding board 10 has a material same as that of the light guiding member 230, the material can be polymethyl methacrylate, polycarbonate, polystyrene, silicone or other transparent material of optical plastic or vitreous.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A light source comprising:
   a light emitter configured to emit light; and
   a light guiding member located at a side of the light emitter comprising:
   a first light entering face on one side of the light guiding member,
   a first light exiting face on an opposite side of the light guiding member, and
   a top face coupling between the first light entering face and the first light exiting face, and comprising a first connecting face directly coupled to the first light exiting face and a second connecting face extending from an angle relative to the first connecting face, the second connecting face coupled to the first light entering face and directly contacting the first light entering face, the first light entering face coupled to the light emitter, wherein the first light entering face has a height larger than that of the first light exiting face;
   wherein the light guiding member is configured to receive the light from the light emitter by the first light entering face and output the light by the first light exiting face.

2. The light source of claim 1, wherein the first light entering face is coupled to the light emitter by a bonding layer.

3. The light source of claim 2, wherein the light emitter comprises a light emitting chip and a phosphor layer located between the bonding layer and the light emitting chip.

4. The light source of claim 3, wherein the phosphor layer is coated on the light emitting chip.

5. The light source of claim 3, wherein the bonding layer has a material of optical clear resin.

6. The light source of claim 3, wherein the first light entering face is facing the light emitting chip and has a height no less than a height of the light emitting chip.

7. The light source of claim 3, wherein the first connecting face is perpendicular coupled to the first light exiting face.

8. The light source of claim 7, wherein the second connecting face is angled relative to the first light entering face and located between the first connecting face and the light entering face.

9. A backlight module comprising:
   a light guiding board; and
   a light source module located at a side of the light guiding board and configured to provide light to the light guiding board; the light source module comprising:
      at least a light source comprising a light emitter configured to emit light; and
      a light guiding member configured to guiding the light from the light emitter to the light guiding board, the light guiding member comprising a first light entering face facing the light emitter, a first light exiting face and a top face connecting between the first light entering face and the first light exiting face, the first light exiting face adjacent to the light guiding board, the first light exiting face having a height less than a height of the first light entering face, the top face comprising a first connecting face directly coupled to the first light exiting face and a second connecting face extending from and angled relative to the first connecting face;
   wherein the first light entering face is on one side of the light guiding member, and the first light exiting face is on an opposite side of the light guiding member; the second connecting face is coupled to the first light entering face and directly contacts the first light entering face;
   wherein the light from the light emitter enters the light guiding member by the first light entering face, and exits the light guiding member by the first light exiting face to reach the light guiding board.

10. The backlight module of claim 9, wherein the first light exiting face has the height thereof equal to a thickness of the light guiding board.

11. The backlight board of claim 9, wherein the first connecting face is coupled and perpendicular to the first light exiting face.

12. The backlight module of claim 11, wherein the second connecting face is angled relative to the first light entering face and located between the first connecting face and the light entering face.

13. The backlight module of claim 9, wherein the first light entering face is coupled to the light emitter by a bonding layer.

14. The backlight module of claim 13, wherein the light emitter comprises a light emitting chip and a phosphor layer located between the bonding layer and the light emitting chip.

15. The backlight module of claim 14, wherein the phosphor layer is coated on the light emitting chip.

16. The backlight module of claim 14, wherein the first light entering face faces the light emitting chip and has a height no less than a height of the light emitting chip.

17. The backlight module of claim 13, wherein the bonding layer has a material of optical clear resin.

18. The backlight module of claim 9, wherein light guiding board comprises a second light entering face, a second light exiting face and a bottom face, the second light entering face connecting between the second light exiting face and the bottom face, the second light exiting face being opposite to the bottom face.

19. The backlight module of claim 18, wherein the light guiding board has a constant thickness.

20. A light source comprising:
   a light emitter configured to emit light; and
   a light guiding member located on a side of the light emitter comprising:
   a first light entering face on one side of the light guiding member,
   a first light exiting face on an opposite side of the light guiding member,
   a top face coupling between the first light entering face and the first light exiting face, and comprising a first connecting face directly coupled to the first light exiting face and a second connecting face extending from an angle relative to the first connecting face, the second connecting face coupled to the first light entering face and directly contacting the first light entering face, the first light entering face coupled to the light emitter, wherein the first light entering face has a height larger than that of the first light exiting face; and
   a bottom face coupling between the first light entering face and the first light exiting face, and parallel to the first connecting face;
   wherein the light guiding member is configured to receive the light from the light emitter by the first light entering face and output the light by the first light exiting face.

* * * * *